United States Patent
Decoux et al.

(10) Patent No.: US 8,467,038 B2
(45) Date of Patent: Jun. 18, 2013

(54) METHOD AND DEVICE FOR MEASURING OPTICAL PROPERTIES OF AN OPTICALLY VARIABLE MARKING APPLIED TO AN OBJECT

(75) Inventors: Eric Decoux, Matran (CH); Xavier Schwab, Prilly (CH)

(73) Assignee: SICPA Holding SA, Prilly (CH)

( * ) Notice: Subject to any disclaimer, the term of this patent is extended or adjusted under 35 U.S.C. 154(b) by 177 days.

(21) Appl. No.: 13/172,445

(22) Filed: Jun. 29, 2011

(65) Prior Publication Data

US 2011/0317150 A1 Dec. 29, 2011

Related U.S. Application Data

(60) Provisional application No. 61/370,228, filed on Aug. 3, 2010, provisional application No. 61/359,654, filed on Jun. 29, 2010.

(30) Foreign Application Priority Data

Jun. 29, 2010 (EP) .................................... 10167697
Aug. 3, 2010 (EP) .................................... 10171741

(51) Int. Cl.
*G06K 9/74* (2006.01)
(52) U.S. Cl.
USPC ............... 356/71; 356/73; 356/445; 356/448; 356/128
(58) Field of Classification Search
USPC .................. 356/71, 73, 445, 448, 128, 135
See application file for complete search history.

(56) References Cited

U.S. PATENT DOCUMENTS 5,596,402 A 1/1997 Markantes et al.
6,365,907 B1 * 4/2002 Staub et al. .................. 250/566

FOREIGN PATENT DOCUMENTS

WO WO 2008/128714 A1 10/2008

OTHER PUBLICATIONS

J.A. Dobrowolski, "Optical Thin-Film Security Devices," Optical Document Security, $2^{nd}$ Ed, Chapter 13, pp. 289-328, 1998.
European Search Report issued Dec. 17, 2010 in Application No. 10167697.1 filed Jun. 29, 2010.

* cited by examiner

*Primary Examiner* — Layla Lauchman
(74) *Attorney, Agent, or Firm* — Oblon, Spivak, McClelland, Maier & Neustadt, L.L.P.

(57) ABSTRACT

A method for measuring optical properties of an optically variable marking applied on an object, the method including the steps of illuminating the optically variable marking so as to form a first light reflected by the marking at a first view angle and a second light reflected by the marking at a second view angle, the first and second lights having different spectral compositions as a result of the optically variable marking, refracting the second reflected light through a optical unit so as to redirect the second reflected light toward an optical sensor, capturing the first light and the second refracted light with the optical sensor simultaneously; and determining optical properties of the optical variable marking based on the captured first and second lights.

13 Claims, 11 Drawing Sheets

METHOD AND DEVICE FOR MEASURING OPTICAL PROPERTIES OF AN OPTICALLY VARIABLE MARKING APPLIED TO AN OBJECT

RELATED APPLICATIONS

This application claims the benefit of priority under §119 (e) of U.S. Provisional Application Nos. 61/359,654 filed Jun. 29, 2010, and 61/370,228, filed Aug. 3, 2010. This application also claims the benefit of priority under 35 U.S.C. §119 from European Application Nos. 10167697.1, filed Jun. 29, 2010 and 10171741.1, filed Aug. 3, 2010, the entire contents of all of which are incorporated herein by reference.

BACKGROUND OF THE INVENTION

1. Field of the Invention

The present invention relates to a method and a device for measuring optical properties of an optically variable marking applied on an object, light coming from the optically variable marking having different spectral compositions when viewed from different angles.

2. Brief Description of the Related Art

In the field of optical inspection of labels, markings, and visible tags, usually a camera system having a lens and an image sensor is used, coupled to a frame grabber and a computer system. The image sensor can be triggered to capture an image when an object carrying the label, marking, or visible code passes into the field of view of the camera system. While the object passes, the label of the object can be captured by the image sensor after a special triggering event, for example by a motion detection sensor so that a digital image of the label can be formed. The image sensor will thereby operate with fast integration times to generate a blur-free image, and usually has the necessary driver and signal electronics to convert the captured light by analog-to-digital conversion into a digital image. The digital image may be held and formatted by the frame grabber, and can be passed on for further processing to a computer system, by using specific image processing algorithms. For example, optical measurements of dimensions of the object can be performed, and optical character recognition or pattern matching algorithms can be used to detect and read certain information that is represented by the labels and markings.

Moreover, devices have been proposed to inspect labels and markings that are made from optical variable ink by a human observer, without the use of camera systems for automated inspection. These devices have proposed to use mirrors installed in a viewing device to reflect light that has been emitted from the optical variable marking, so that the human observer can look at the optical variable marking from a fixed spatial orientation. This allows the observer to see simultaneously the image of the optical variable marking in first and second colors without movement of the observer.

Despite all of the technologies in the field of optical inspection systems, in the field of measuring properties of optically variable markings, dedicated optical inspection solutions are still needed, to improve costs, performance and versatility of these systems.

SUMMARY OF THE INVENTION

One aspect of the present invention provides for a method for measuring optical properties of an optically variable marking applied on an object. Preferably, the method includes the steps of illuminating the optically variable marking so as to form a first light reflected by the marking at a first view angle and a second light reflected by the marking at a second view angle, the first and second lights having different spectral compositions as a result of the optically variable marking, and a step of refracting the second reflected light through a optical unit so as to redirect the second reflected light toward an optical sensor. Moreover, the method further preferably includes a step of capturing the first light and the second refracted light with the optical sensor simultaneously; and determining optical properties of the optical variable marking based on the captured first and second lights.

According to another aspect of the present invention, a device that is configured to measure properties of an optically variable marking applied on an object is provided. The device preferably includes a light source configured to illuminate the optically variable marking so as to form a first light reflected by the marking at a first view angle and a second light reflected by the marking at a second view angle, the first and second lights having different spectral compositions as a result of the optically variable marking, and a prism that refracts the second reflected light so as to redirect the second reflected light. Moreover, the device preferably includes a optical sensor that captures the first light and the second refracted light simultaneously, and a processing unit that determines optical properties of the optical variable marking based on the captured first light and the second refracted light.

According to yet another aspect of the present invention, a device for measuring properties of an optically variable marking is provided, the marking applied on an object. The device preferable includes a light source that illuminates the optically variable marking so as to form a first light reflected by the marking at a first view angle and a second light reflected by the marking at a second view angle, the first and second lights having different spectral compositions as a result of the optically variable marking, and an optical refracting device for refracting the second reflected light to a direction that is different from the second view angle, to form a redirected second light. Moreover, the device preferably includes an optical sensing device that captures the reflected first light and the redirected second light simultaneously, and a processing unit connected to the optical sensing device that determines optical properties of said optical variable marking based on information received from the optical sensing device.

The summary of the invention is neither intended nor should it be construed as being representative of the full extent and scope of the present invention, which additional aspects will become more readily apparent from the detailed description, particularly when taken together with the appended drawings.

BRIEF DESCRIPTION OF THE DRAWINGS

These and other features, aspects and advantages of the present invention will become better understood with regard to the following description, appended claims and accompanying drawings where:

Herein, identical reference numerals are used, where possible, to designate identical elements that are common to the figures. The images in the drawings are simplified for illustrative purposes and may not be depicted to scale.

DETAILED DESCRIPTION OF THE INVENTION

Figure 1:
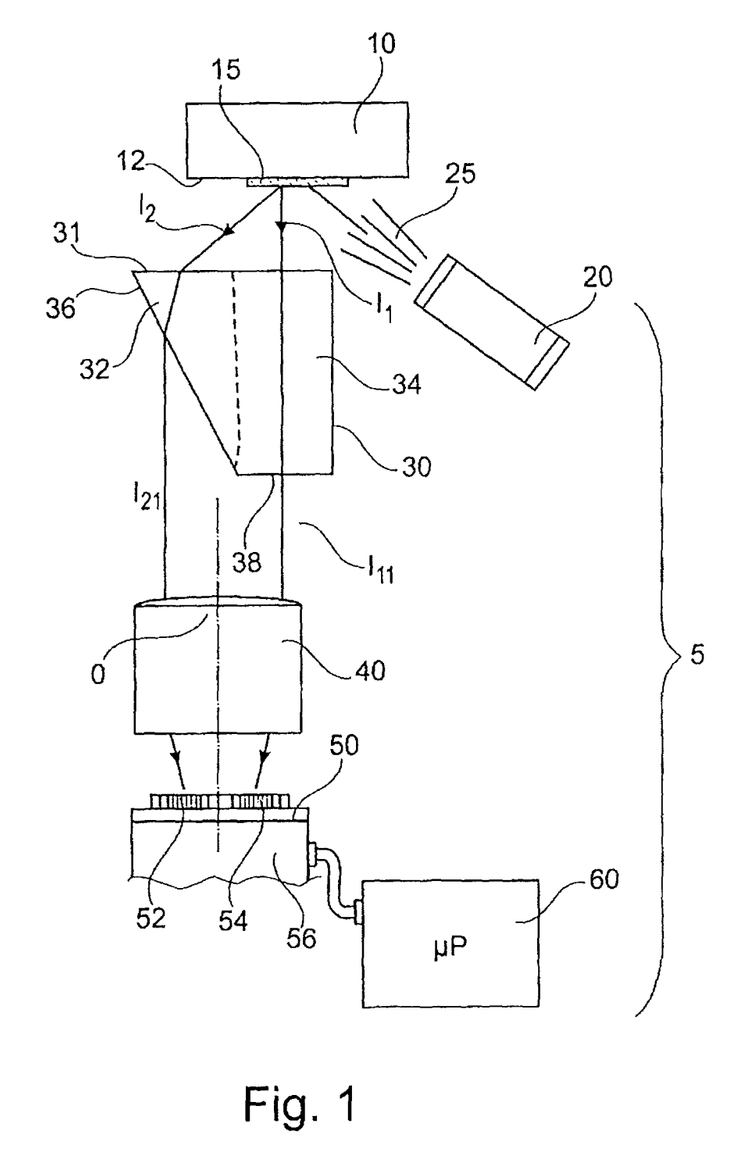
FIG. 1 shows a schematic view of the device for measuring optical properties of optically variable markings according to an embodiment of the present invention.

In accordance with the present invention, device 5 for measuring optical properties of optically variable markings is schematically illustrated in FIG. 1. An object 10 that is to be inspected, for example a package for pharmaceutical products, or a bank note having certain security features in the form of an optical variable marking, is moved past the device 5 in a direction V that is substantially perpendicular to the optical axis O defined by lens 40, for example by using a conveyor belt of an automated packaging system. The object 10 has a optically variable marking 15 that is printed on its front surface 12. The marking 15 may have been previously printed onto the object 10 by the use of optically variable ink (OVI). The markings 15 can be made by thin-film multilayer coatings with different optical thicknesses and refractive indexes so that the color or the wavelength of the reflected light will change as a function of the angle of observation or reflection.

For example, the marking 15 may have characteristics making it capable of reflecting certain wavelengths of illumination light in a different manner, depending on the viewing angle to the surface 12, to form different spectral composition of the light when viewed in different directions. For example, the OVI can be made to have color-shifting properties such that from an angle of view $\alpha_1$ that is substantially perpendicular ($\alpha_1=0°$, +/−5° to front surface 12 of the object 10, the marking 15 is seen in a primary color PC, for example green, and when the marking 14 is viewed from an oblique angle with respect to the front surface 12, for example an angle $\alpha_2$, a secondary color SC is seen. The OVI of marking 15 can also be made such that primary, secondary and tertiary colors, PC, SC, and TC are seen from respective angles of view, or more angles, and the color shift continuously changes with a continuous change of an angle of view.

For example the OVI of the marking 15 can be made such that the light reflected from the marking 15 changes from red color to green color with an increasing angle of view, for example starting at angle $\alpha_1=0°$, +/−5° that is substantially perpendicular towards the front surface 12 of object 10. The reflectance as a function of the wavelength is variable depending on the angle of view. For example the reflectance curve may have a peak at a certain wavelength, for example at 650 nm for the red color, and depending of the angle of view, the peak of the reflectance curve moves to 510 nm for the green color. In another variant of marking 15, the OVI is made such that light of different polarization is emitted, when viewed from different angles of view. The polarization can change as a function of the angle of observation, and therefore different angles of observation are used to analyze different polarization. Moreover, it is possible to make marking 15 such that logos, texts or pictures that are covered by a optically variable layer made of OVI having a variable transparency that changes with the angle of view. Thereby, a logo may be concealed if viewed from one angle, but can be visible when viewed from a second angle. It is also possible that an angle $\alpha_1 \neq 0°$ has to be used to see the primary color PC, depending on chemical and optical properties of the OVI material and the printing environment.

The marking 15 printed on the object 10 may include a particular pattern or shape that can be easily analyzed by device 5 including certain information. For example, a special character, a matrix code, bar codes, images, etc. may be printed as marking 15. An illumination device 20 is used to emit light 25 onto the marking 15, for example by the use of white light emitting diodes (LED). Illumination device 20 is configured such that sufficient light is reflected from marking 15 so that an optical sensor, such as an image sensor, can capture the emitted light for further processing. As an example, the illumination can be a directional light source using one or a plurality of white LEDs, depending on the light intensity generated by the LEDs, for example the Edmund™ advanced illumination high intensity LED spot lights. The illumination angle $\alpha_{ill}$ may also impact the angles of the color shift properties. In a variant, the illumination device 20 can be arranged at various locations in front of the surface 12, so as to have increased uniformity of the illumination of marking 15 by light 25. The wide spectral white light 25 is then reflected from the marking 15. A first light $l_1$ is reflected from surface 12 of object 10 from a first angle, in the example shown an angle at 0° that is substantially perpendicular to surface 12. The first light $l_1$ can have a first property, for example a first primary color (PC), or a first pattern or polarization that is visible from the first angle. In addition, seen from an angle that is oblique to the front surface 12 of the object 10, in the example shown at about 45°, a second light $l_2$ is reflected, having a second property that is different from the first property. The second property could be the emission of a secondary color (SC), or a second pattern that is visible from the second angle, but not from the first angle. In the case the first and second properties are different colors PC and SC, first light $l_1$ and second light $l_2$ will be emitted at these colors PC and SC, and will have a substantially non-overlapping range of wavelengths between 200 nm and 900 nm, for example a spectral composition as a function of the wavelength of the PC that has its peak at 650 nm, and a spectral composition as a function of the wavelength of the SC that has its peak at 510 nm.

Device 5 is configured such that the second light $l_2$ is reflected towards front surface 31 of prism 30 and enters into first portion 32 of prism 30, and is directed towards a rear surface 36 of the first portion 32 by refraction. The prism 30 has a refractive index n that is different from the refractive index $n_{env}$ of the surrounding environment, i.e. air. Second refracted light $l_{21}$ then exits rear surface 36 of the first portion 32 of prism 30, with an angle that is different from a propagation angle of second light $l_2$. The second refracted light $l_{21}$ thereby changes its direction and may have some color dispersion that largely depends on the material used for the prism, but no shift of the wavelength occurs. Second refracted light $l_{21}$ is captured by a lens 40, and a pattern 52 of the marking 15 is then formed and captured at a first location on optical sensor 50, for example an image sensor. At the same time, first light $l_1$ is reflected towards front surface 31 of prism 30 and enters into a second portion 34 of the prism 30. The first and second light $l_1$ and $l_2$ have propagation angles with respect to the front surface $l_2$ of the object 10 that are different. In the variant shown, the angle of first light $l_1$ is substantially parallel to the optical axis O and substantially perpendicular to front surface $l_2$ of object 10, and directed towards the lens while the angle of $l_2$ is too large to hit the lens directly. First light $l_1$ is then propagates towards rear surface 36 of the first portion 32 and exits the rear surface 38 as first light $l_{11}$ with an angle that is substantially the same as the propagation angle of the first light $l_1$. Preferably, the angular separation between the second refracted light $l_{21}$ and the first light $l_{11}$ does not exceed 10°.

Prism 30 is arranged such that second refracted light $l_{21}$ is also directed towards the lens 40 and is guided towards optical sensor 50 by lens 40. First light $l_{11}$ is then captured by lens 40 and pattern 54 of the marking 15 is then captured by a second portion of the second location not overlapping the first location the optical sensor 50, different location of optical sensor 50. This arrangement allows to simultaneously capture the first and second pattern 52 and 54 with the optical sensor 50, the patterns 52 and 54 being formed by the second refracted light $l_{21}$ and first light $l_{11}$, respectively, without needing any additional cameras or synchronization mechanisms. This allows to apply digital processing to both patterns 52 and 54 in a single image that was captured from optical sensor 50. For example the simultaneous capture allows to capture patterns 52 and 54 within the same integration period of an optical sensor 50.

The use of prism 30 presents several advantages when inspecting markings 15 made of OVI comparing to the use of mirrors to reflect lights $l_1$ and $l_2$. For example, mirrors usually introduce linear distortions to an image that is captured by sensor 50, so that further corrective processing might be required, and the detection quality and precision of the first and second properties of marking 15 could be strongly reduced. In addition, the use of mirrors could introduce additional multiple reflections, so that it would not be possible to separately project patterns 52 and 54 on separate areas of optical sensor 50, without overlapping multiple-reflections from elements in the device 5. Multiple reflections occur when light is reflected more than once between two or more mirrors. Additional, undesired secondary reflections may then interfere with the images generated by the primary, desired reflections of the light. The use of a lens 40 and prism 30 allows to reduce linear distortions substantially in comparison with mirror-based systems to change the propagation of light, and also present the substantial advantage over mirror-based systems that double reflections between the mirrors can be avoided, that might impede or render certain measurements impossible.

This simultaneous capture of the patterns 52, 54 for different lights having a first and a second property that were reflected by different angles during the same integration time of optical sensor 50 provides additional advantages for the measurement and analysis purposes. Given a specific integration time of an optical sensor 50 implemented as an image sensor, for example a Charge-Coupled Device (CCD) or a Complementary Metal-Oxyde Semiconductor (CMOS) imaging sensor, for example in a range from 1 µs to 100 ms, it is possible to simultaneously capture patterns 52 and 54, and subsequently directly compare patterns 52 and 54 that originate from the same marking 15.

In a variant, it is also possible to only use the first portion 32 of prism 30, being of a triangular cross-sectional shape, while the second portion 34 is not present, and first light $l_1$ does not pass through another optical medium. Thereby, first light $l_1$ that is emitted perpendicularly from the marking 15 will be directly captured by lens 40 and optical sensor 50. The part of front surface 31 of the first portion 32 of prism is arranged such that its width is wider than a width of the marking 15, for example in a direction of movement V of the object 10.

Optical sensor 50 is then used to capture an image of first and second patterns 52 and 54, and the image can be converted into a digital format. Optical sensor 50 is coupled with a driver unit 56 that is configured to read out the images that are captured by sensor 50. For example, all the drivers, clock signal generators, supply and reference voltage generators, analog-to-digital converters, timing signal generators, memory buffers, etc. can be part of the driver unit 56. Driver unit 56 itself is coupled to a processing unit 60 that can perform data and image processing on the images that are captured by optical sensor 50. The processing unit 60 can be realized by a Personal Computer (PC), or by an intelligent camera system that reunites both the processing unit 60, optical sensor 50 and driver unit 56, as an example the Cognex™ InSight 1400c, and can include a hardware processor and memory that is configured to store computer-readable instructions that are able to perform various data processing, visualization and communication functions, when the instructions are executed on a processor. The memory can be volatile or FLASH memory, or a combination thereof. In addition, processing unit 60 may also include hardware-coded image processing chips, field-programmable gate arrays (FPGA), or complex programmable logic devices (CPLD) that can perform data processing such as image processing, feature extraction, statistical algorithms, and calibration algorithms, etc. For example, unit 60 may perform image filtering such as median filtering, image calibration, background image sensor noise calibration, statistical image analysis, estimation, look-up table generation and management, etc.

Typical measurements that are done by processing unit 60 with the captured image data representing patterns 52 and 54 having a first and a second property, respectively, for example primary and secondary color PC, SC, include reading of data matrix codes, bar codes, color quality print inspection, analysis of polarizing patterns, verification of geometry of markings etc. For example, such measurements allow to verify whether the marking 15 is made of a special OVI type that has precisely defined color shifting properties if a color optical sensor 50 is used. For example, the processing unit 60 can compare the spectral profiles for both the first and second light $l_{11}$ and $l_{21}$ as a function of the wavelength, with reference profiles that are stored in processing unit 60. As another example, pattern 54 may show a first logo that is visible by light $l_{11}$, while pattern 52 may show a second logo that is different from the first logo by light $l_{21}$, in light of the variable transparency of marking 15 when viewed from different angles.

Figure 2:
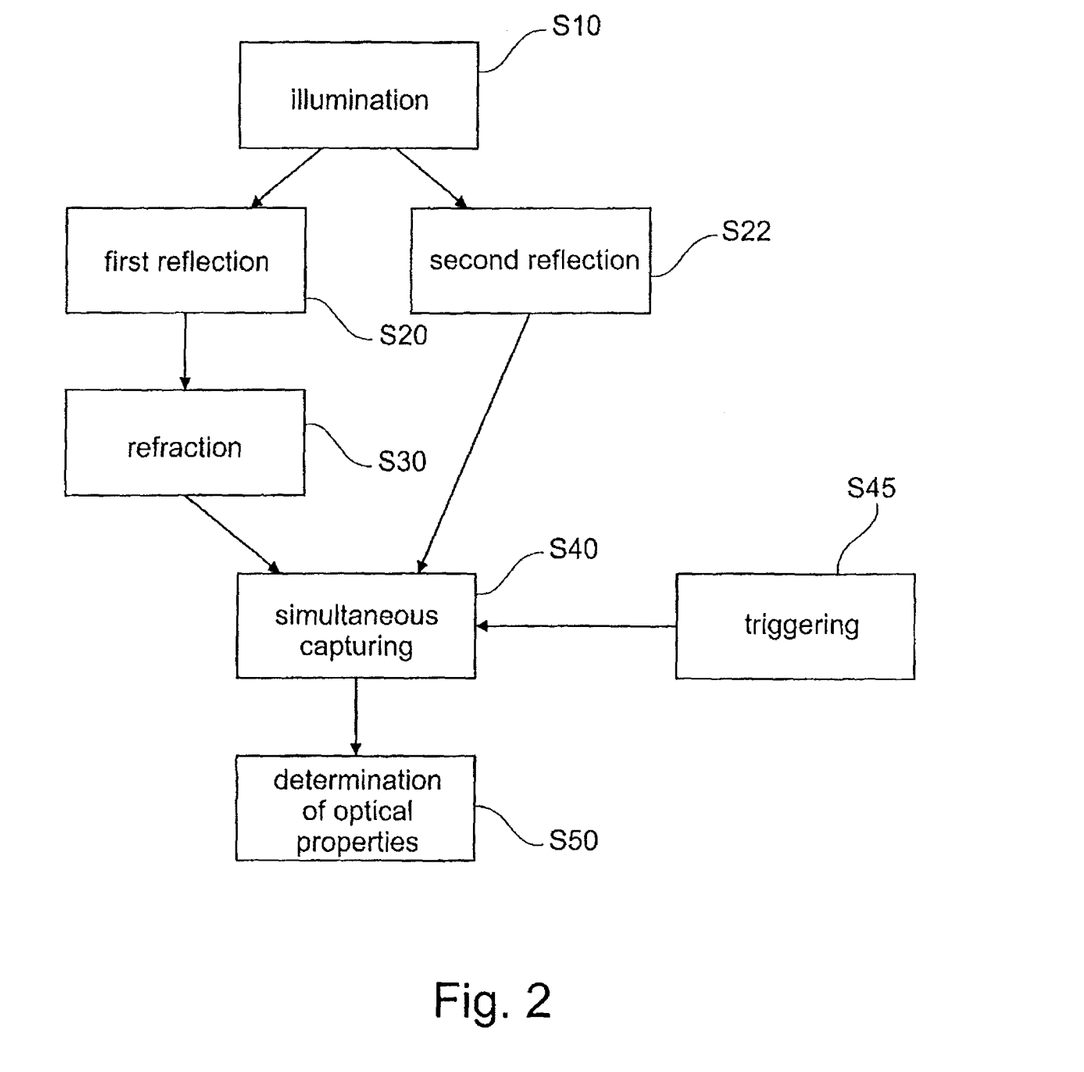
FIG. 2 shows a diagram representing the steps of a method to measure optical properties of optically variable markings according to the present invention.

FIG. 2 shows a diagram representing the steps of a method to measure optical properties of optically variable markings that can be performed on device 5, as shown in FIG. 1. Object 10 passes in front of device 5 that is configured to measure properties of an optically variable marking 15, such that the marking 15 is in a field of view of lens 40 and optical sensor 50, for example an image sensor, and is illuminated in a step S10 by the illumination device 20 with a wide-spectral white light, in a step S10. Next, first light $l_1$ is reflected from the marking 15 at a first angle from surface 12 of object 15 in a step S22, and second light $l_2$ is reflected from the marking 15 at a second angle from surface 12 of object 15 in a step S20. The reflected second light $l_2$ is emitted towards a first portion 32 of prism 30, and is refracted in a first portion 32 to exit as refracted second light $l_{21}$, in a step S30. Simultaneously, in the diagram shown, the first light $l_1$ does not pass through any other optical medium other than lens 40 for focusing an image onto optical sensor 50. In a variant, the first light $l_1$ may be guided through an optical medium, such as a second portion 34 of prism 30.

Next, second refracted light $l_{21}$ and first light $l_1$ are propagating towards the lens 40 and are focused by lens 40 onto an optical sensor 50, to form patterns 52 and 54 of second refracted light $l_{21}$ and first light $l_1$, respectively, in a step S40. A triggering step S45 is performed, that provided a signal to optical sensor 50 or driver unit 56, to indicated when image of patterns 52 and 54 has to be captured. The trigger signal can trigger image integration by optical sensor 50, as soon as a projection of marking 15 as pattern 54 by first light $l_1$ onto the frontal surface 31 of prism 30 is located with an area of the first portion 32 of prism 30. For example, such triggering can be implemented by a light barrier that detects the arrival of object 10 into a triggering zone, or by the optical sensor 50 itself, by reading out partial images at a high frequency to detect arrival of object 10. Then, these patterns 52 and 54 are simultaneously captured in the same integration period of the image sensor, are converted into a digital image, and the digital image is submitted to a processing unit 60, in a step S40.

In the next step S50, the processing unit 60 evaluates the digital image and the patterns 52 and 54 having a first and a second property, respectively, that were captured. For example, a color processing may be performed, to verify whether the color range and intensity with respect to certain wavelengths for each pattern 52, 54 correspond to a predetermined pattern where a specific wavelength λ is compared to an amplitude. Also, the processing unit 60 may transform RGB color information into Hue-Saturation-Lightness (HSL) or Hue-Saturation-Value (HSV) color information so that feature detection, image segmentation, or color analysis on the images can be facilitated. Such color processing can be combined with other processing algorithms, for example the reading of a bar code or a matrix code, measurement of certain dimensions of the marking 15, reading of certain printed information, identifying a symbol or logo, etc. As another example, pattern matching on patterns 52 and 54 that have different properties can be performed.

Figure 3A:
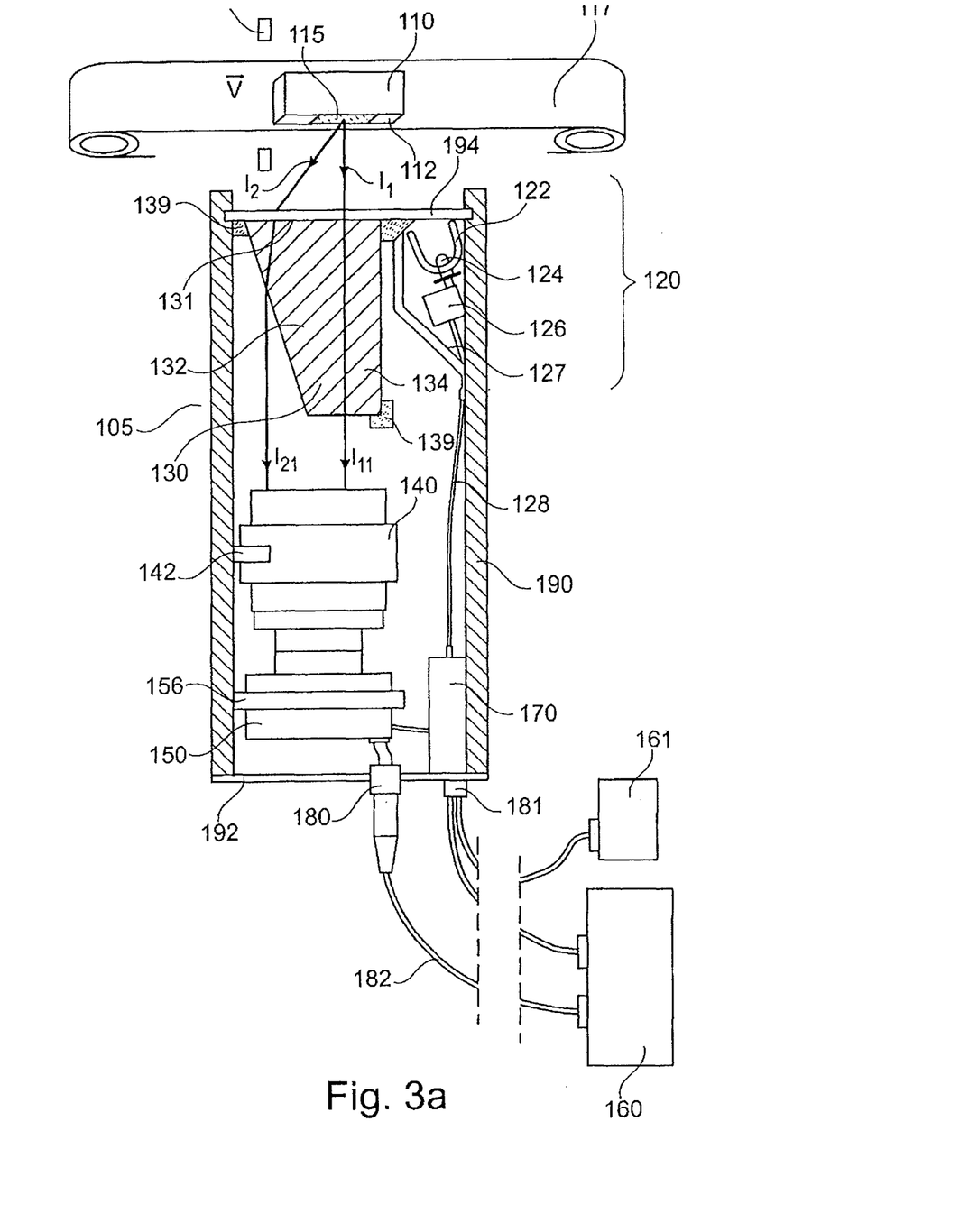
FIGS. 3A and 3B show schematic cross-sectional view and a frontal view of a device for measuring properties of optically variable markings according to the present invention.
Figure 3B:
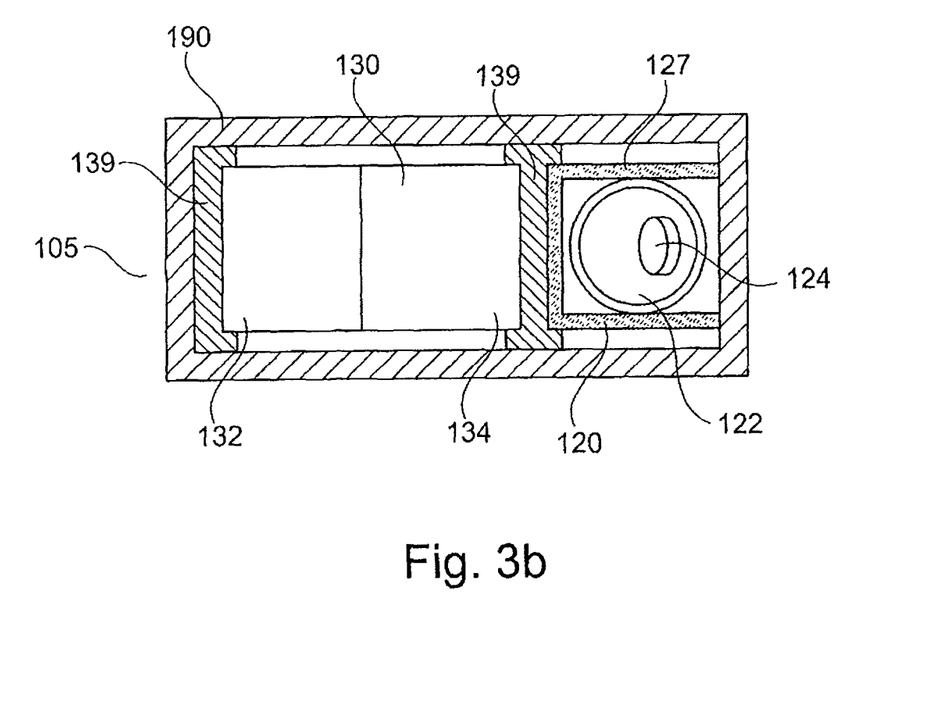

Next, in FIGS. 3A and 3B, a schematic cross-sectional view and a frontal view of the device 105 for measuring optical properties of optically variable markings is depicted. The object 110 that is to be inspected has an optical variable marking 115 on a surface 112 that faces the device 105, and is moved past a field of view of the device 105 by a conveyor belt 117. Device 105 is composed of a casing 190, for example an aluminum or a polymer profile, with frontal window 194 that can be made of scratch-proof quartz glass or regular glass, and rear closure 192 having connectors 180, 181 arranged therein. Connector 180 can be a high-speed image data transfer bus 182 that connects camera 150 to processing unit 160 for further processing of digital images that are delivered by camera 150. An exemplary camera 150 for this application could be a Genie™ C640-1/3 with a resolution of 640×480 pixels, having a C-mount or CS-mount lens interface. Camera 150 is attached to the side walls of casing 190 with a holding bracket 156. Moreover, lens 140 is attached to casing 190 with bracket 142, and is coupled to the C-mount or CS-mount interface of camera 150. A typical lens 140 that could be used for this application is a may be a Computar™ or a Fujinon™ lens. Bracket 142 serves to stabilize the lens 140, but also to fix the focal point of lens 140 to a certain position.

Moreover, a prism 130 is arranged inside casing 190 and is in direct contact with the frontal window 194, and attachment elements 139 are arranged in casing 190 to attach prism 130 to fixed position. Frontal window 194 and prism 130 can also be made from one single piece. The prism can be made from the material Silica Saphire, Polymers like Polycarbonate, Polymethylmethacrylate (PMMA), etc. An exemplary prism could be a Littrow dispersion prisms like Edmund™ NT43-672, 12.7 mm×12.7 mm×21.9 mm. The prism 130 is not as wide as the casing interior width, so that an illumination device 120 can be arranged next to the prism 130, also facing the frontal window 194. In a variant, the illumination device 120 can also be arranged outside of casing 190 to avoid reflection on frontal window 194. A separation shield 127 is arranged to optically separate the illumination part from the prism 130, to avoid that parasitic light enters through a side wall of prism 130 that would interfere with first and second lights $l_1$ and $l_2$ inside prism 130 of the marking 115. The inside of the casings can be covered with black paint or a coating having very low reflective characteristics, and screens can be added to the prism 130 to reduce the field of view of the prism. These screens can be applied to the frontal surface 131 of prism 130 to define input zones for lights $l_2$ and $l_1$. The illumination device 120 can include a reflector 122, a light emitting element 124 such as a light-emitting diode (LED) or halogen bulb, that is connected to a power supply unit 126. For example, the illumination device 120 could be an Edmund™ advanced illumination high intensity LED spot light. Illumination device 120 is connected to a control unit 170 that can be arranged inside the casing 190, that can provide power control, trigger signals for stroboscope illumination of the illumination source 120. A trigger detection unit 172, for example a light barrier 172, can be also in connection with the control unit 170, so that trigger signals for triggering image acquisition by camera 150 and for the stroboscope lighting 120 can be provided. The control unit 170 itself can be in connection by a port 181 with an external power supply 161, and can also be in connection with the processing unit 160 for providing or receiving trigger signals, and other control information, for example to supervise the power supply and temperature of device 105.

FIG. 3B depicts a frontal view of the device 105 showing the first and second portion 132, 134 of the prism 130, located on the left side in casing 190. The separation shield 127 is located in the area on the right side of the casing 190, surrounding the illumination device 120 with the light emitting element 124 and the reflector 122. Moreover, the attachment elements 139 are also shown through the transparent frontal window 194, that lodge the prism 139 and the separation shield 127 to a defined position in the casing 190.

Figure 4:
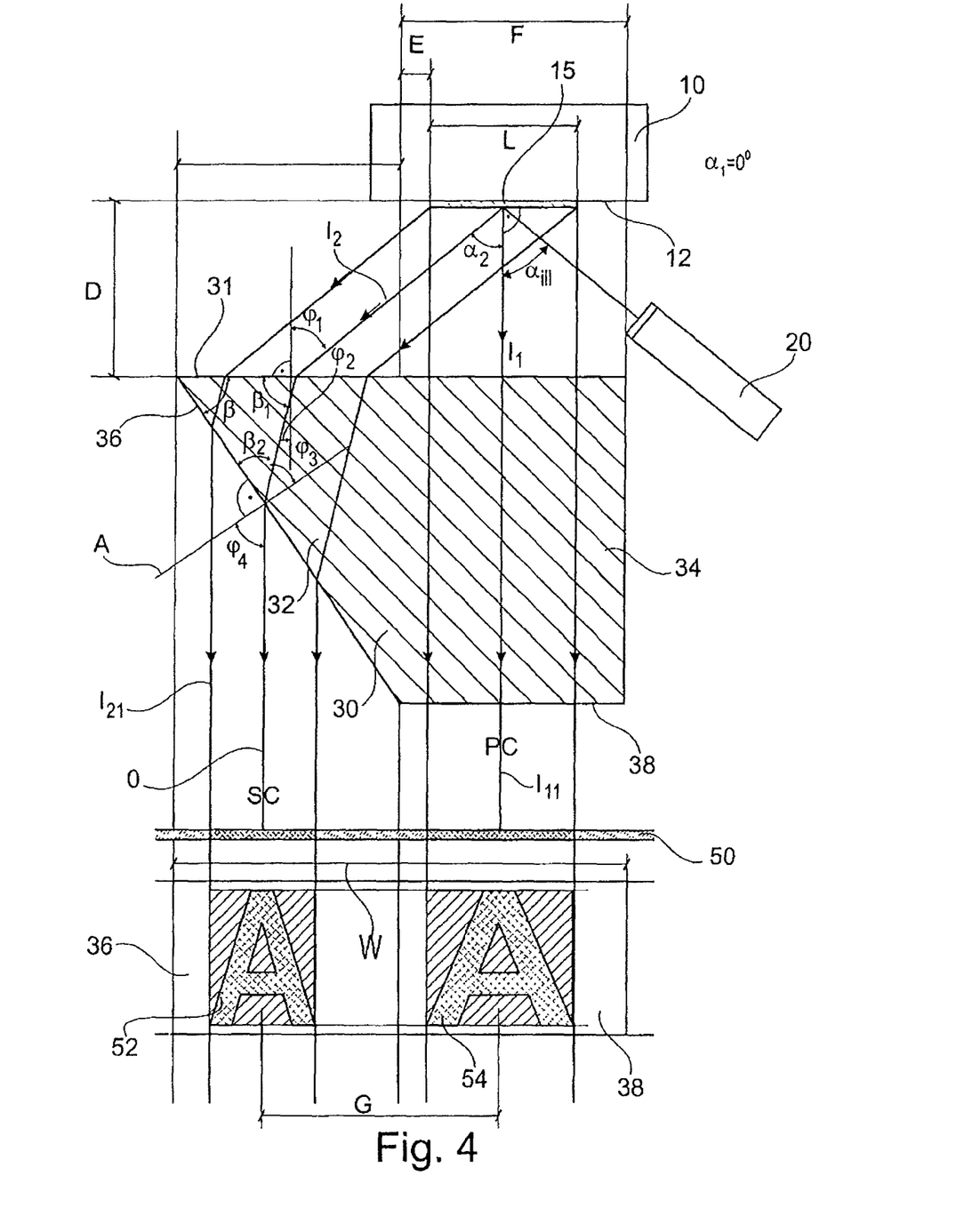
FIG. 4 shows schematic view of the device for measuring optical properties of optically variable markings with some dimensions and geometric relationships of the elements.

FIG. 4 shows a diagrammatical view of the dimensions and geometric relationships for elements of the optical detection device 5 and object 10 with marking 15 at a possible time instance of image capture. The dimensions and geometric relationships are primarily determined by the size of marking 15 and the characteristics of the OVI. For example, depending on the OVI used and the multilayer structure of marking 15, different properties of the marking will determine the ideal angle $\alpha_2$. In addition, angle of illumination $\alpha_{ill}$ will impact the ideal angle $\alpha_2$. Angle $\alpha_2$ is usually chosen larger than $\alpha_{ill}$ to avoid direct reflection. For example, in a case where the first and second properties are the primary and secondary colors PC, SC, the angle $\alpha_2$ will be determined such that the SC can be readily detected and clearly distinguished from the PC that can ideally be seen from an angle $\alpha_1=0°$, and based on geometric considerations of readability of marking 15 under an oblique angle. The dimensions and geometric relationships are set such that second refracted light $l_{21}$ and the first light $l_{11}$ will be propagating towards the image sensor 50 by means of lens 40. Preferably, the angular separation between $l_{11}$ and $l_{21}$ is chosen such that patterns 52 and 54 are sufficiently spaced apart from each other so that they are projected on respective areas of image sensor 50, given a distance G between the center of pattern 52 and pattern 54. Please note that the image sensor 50 is shown out of proportion in FIG. 4, without lens 40, and the width of image sensor 50 is usually smaller than B and F.

The marking 15 has a defined width L, the front surface of the first portion 32 of prism 30 has a width B, and the front surface of the second portion 34 of prism 30 has a width F. Moreover, a distance between a front surface 12 of object 10 and the front surface 31 of prism 30 is D, in a direction that is perpendicular to surface 12. The width E represents a lateral distance between a forward edge of marking 12 and a right side edge of the first portion 32 of prism 30 at a time of image capture by sensor 50. In the variant shown, the first portion 32 of prism has a cross-sectional shape of a right triangle. Moreover, an optical axis O of image sensor 50 and lens 40 (FIG. 1) is also perpendicular to the front surface 12 of object 10. The illumination device 20 is arranged on a right side so as not to obstruct the reflection of light from marking 15 to front surface 31 of prism 30, and is arranged so as to illuminate angle $\alpha_{ill}$ with respect to the optical axis O. The second reflected light $l_2$ emits from marking 15 with an angle $\alpha_2$, and enters a front surface 31 of prism 31 with an angle $\phi_1$ with respect to a axis that is perpendicular to front surface 31. In the variant shown the axis that is perpendicular to front surface 31 is parallel with the optical axis.

Next, second reflected light $l_2$ propagates with an angle $\phi_2$ with respect to the axis that is perpendicular to front surface 31, and with an angle $\beta_1$ with respect to front surface 31 itself, inside first portion 32 of prism 30, and impacts on rear surface 36 of first portion 32 of prism 30 with an angle $\phi_3$ with respect to the axis A that is perpendicular to rear surface 36, and with an angle $\beta_2$ with respect to rear surface 36 itself. The second refracted light $l_{21}$ changes its angle of direction when exiting prism 30, having an angle $\phi_4$ with respect to axis A that is perpendicular to rear surface 36. Moreover, the angle of inclination of the first portion 32 of prism 30 is $\beta$. In the variant shown, $\beta$ and the dimensions of prism 30 are chosen such that second refracted light $l_{21}$ and the first light $l_{11}$ propagate towards the lens 40 and image sensor 50. The patterns 52 and 54 that are formed on image sensor 50, for example, presenting letter A, and are projected from the rear surfaces 36 and 38, respectively, of the prism 30.

When designing the devices 5, 105 with its elements, the following relationships have been found. Width B of the front surface of the first portion 32 of prism 30 having a refractive index n, forming a side of a right triangle, is preferably a factor in a range between 1.2 to 3 times the width L of the marking, more preferably in a range between 1.5 and 2 times width L. Width B can be smaller than width L in case where it is not necessary to check geometry of marking 15 by two full patterns 52 and 54. Moreover, a distance E at time of image capture is such that it is in a range between 0.1 times width L up to 0.5 times L, more preferably in a range between 0.2 times L to 0.3 times L. Width L is generally larger than 1 mm. Observation angle $\alpha_2$ of second reflected light $l_2$ is chosen according to the type of OVI used for marking 15, and is in a range of 40° to 85°, and observation angle $\alpha_1$ of first light $l_1$ is around 0°. In the variant shown, the angle $\alpha_2$ is about 45°. Based on these parameters, a preferably distance D can be calculated, based on the following equation [1]:

$$D = \frac{B}{\tan\alpha_2} \quad [1]$$

Moreover, the angle $\beta$ that should be used for the triangular first portion 32 of the prism 30 is defined as follows:

$$\beta = \arctan\left(\frac{n \cdot \sin\varphi_2}{n \cdot \cos\varphi_2 - 1}\right) \quad [2]$$

and the angle $\phi_2$ is defined as by the following equation [3]

$$\varphi_2 = \arcsin\left(\frac{\sin\varphi_1}{n}\right) \quad [3]$$

These equations [1], [2], and [3] are based on the fact that $\beta+\beta_1+\beta_2=180°$, and according Snell's law:

$$\frac{\sin\varphi_1}{\sin\varphi_2} = \frac{n}{n_{env}} \quad [4]$$

and $$\frac{\sin\varphi_3}{\sin\varphi_4} = \frac{n_{env}}{n} \quad [5]$$

Moreover, in the arrangement shown in FIG. 4, where front surface 31 is perpendicular to the optical axis O, the following equation [6] also applies:

$$\beta=\phi_4 \quad [6]$$

so that a direction of $l_{21}$ and $l_{11}$ propagate in a direction defined by optical axis O towards the arrangement of the lens 40 and the image sensor 50.

Moreover, the width of the field of view W of image sensor 50 is arranged such that it covers both pattern 52 that is emitted by second refracted light $l_{21}$ from rear surface 36 of prism 30, and pattern 54 that is emitted by first light $l_{11}$ from rear surface 38 of prism 30. This arrangement is achieved by having images sensor 50 with the adequate size together with a corresponding lens 40 for projection.

Figure 5:
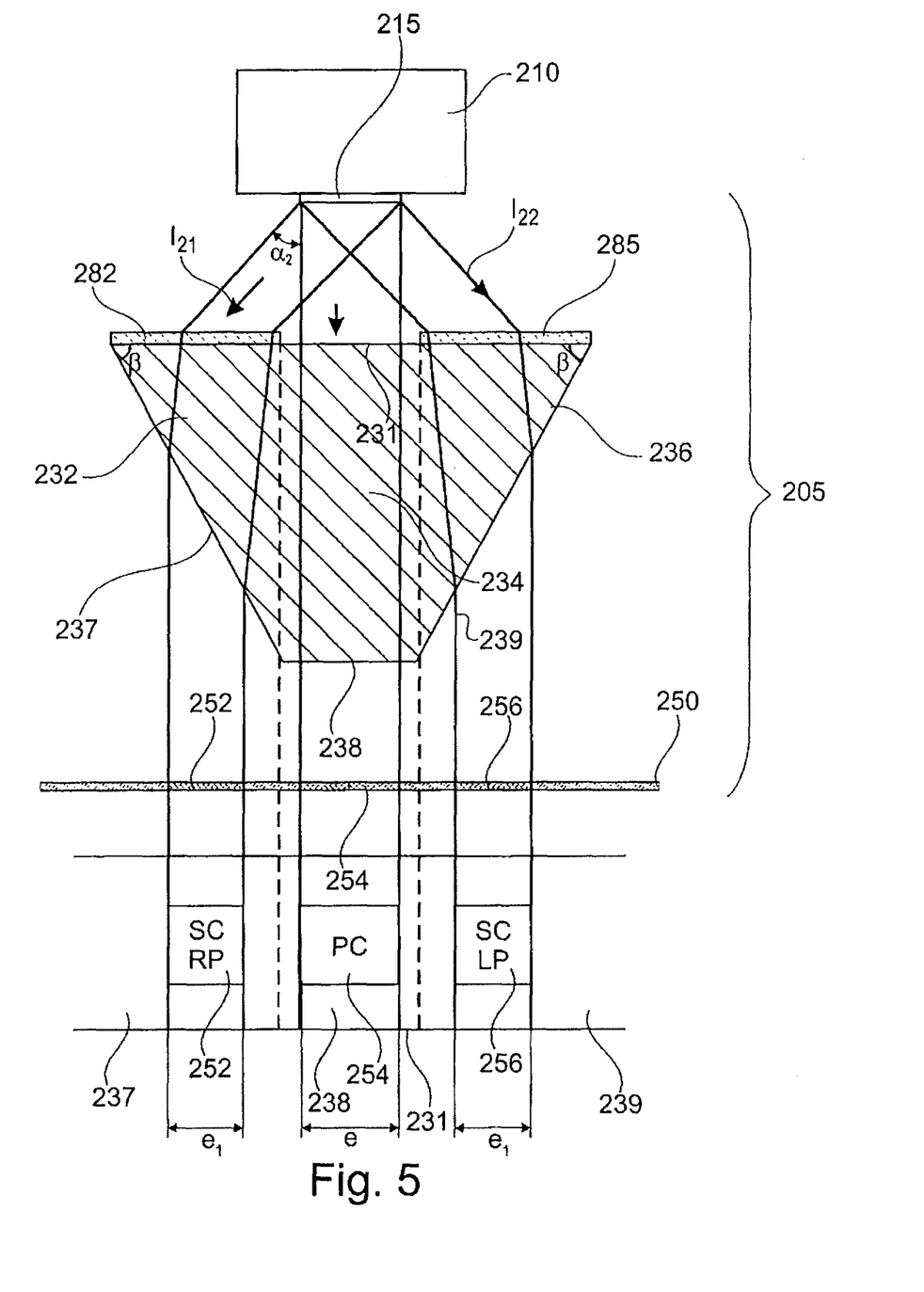
FIG. 5 shows a schematic view of the device for measuring optical properties of optically variable markings according to another aspect of the present invention.

FIG. 5 depicts a diagrammatic cross-sectional view of a variant of a device 205 for measuring optical properties of optically variable markings, where different polarization filters 282, 285 are used to filter the second reflected lights $l_{21}$ and $l_{22}$ that are both emitted at opposing angles $\alpha_2$ axi-symmetrically. Filters 282, 285 are configured such that the second reflected lights $l_{21}$ and $l_{22}$ have different states of polarization after passing through filters 282, 285, for example of the secondary color SC that is propagated at angle $\alpha_2$, and can be applied as a film or a layer onto a front surface 231 of prism 230. In a variant, filters 282, 285 can be arranged at various places between marking 215 and image sensor 250, for example, these filters can be arranged in front of prism 230 without being in contact with front surface 231, or behind the prism 230 between prism 230 and image sensor 250, for example at the lens (not shown). The device 205 is depicted at a time instance where an image is captured by image sensor 250, and object 210 is substantially located in a center that is defined by the axi-symmetrical middle line of prism 230, along an optical axis O of a lens. Marking 215 on object 210 emits the second light at angle $\alpha_1$ towards both sides symmetrically to each other. The prism 230 has a special trapezoidal cross-sectional shape, with both triangular outer parts 232 and 236 having a slope angle $\beta$. The oblique rear surfaces 237 and 239 will emit a light that will form patterns 252 and 256 on image sensor 250. The middle portion 234 of prism could also be left out, so that the pattern 254 of the primary color PC is directly captured from marking 215, and the prism portions 232 and 234 form two separate prism having a triangular cross-sectional shape. This arrangement allows to produce to patterns 252 and 256 of second light $l_{21}$ and $l_{22}$ having a second property, for example a secondary color SC or a certain polarization, with a different polarization, for example left polarization LP and right polarization RP, shifted by 90°, when two polarization filters 282, 285 are inserted in the corresponding optical path. Because device 205 has an axi-symmetric configuration, width $e_1$ of patterns 252 and 256 that are projected onto image sensor 250 is the same, while width e of pattern 254 of the primary color PC is wider than $e_1$.

The generation of two substantially identical patterns 252 and 256 generated from light emission from marking 215 with the symmetrical geometry of prism 230, but having a different polarization state that are generated by filters 282, 285, respectively, can serve to analyze the nature of the liquid crystal polymer of the OVI, and to verify whether it is an original or a tampered marking 215.

Figure 6:
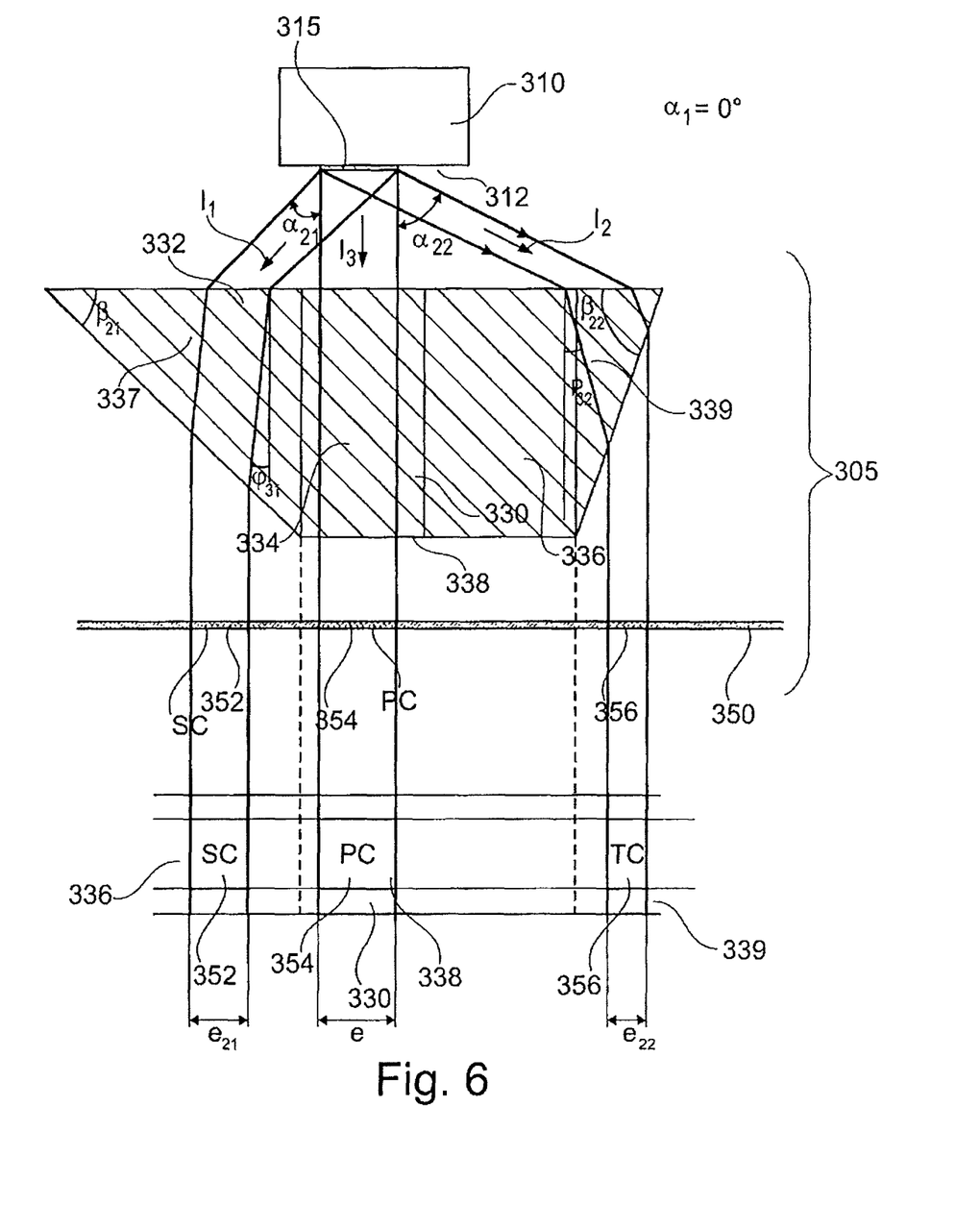
FIG. 6 shows a schematic view of the device for measuring optical properties of optically variable markings according to yet another aspect of the present invention.

FIG. 6 depicts a diagrammatic cross-sectional view of a variant of a device 305 for measuring optical properties of optically variable markings, for example where three different properties of marking 315 have to be detected. For example, marking 315 could generate reflected lights $l_3$, $l_1$ and $l_2$ to form a primary, secondary and tertiary color PC, SC, and TC that are reflected from marking 315 on object 310. Again, the device 305 is depicted at a time instance where an image is captured by image sensor 350, and object 310 is substantially located in a center of a middle portion 334 of prism 330. Marking 315 is arranged with an OVI such that the primary color PC is reflected perpendicularly from surface 312 of object 310, the secondary color SC is reflected by an angle $\alpha_{21}$, and the tertiary color TC is reflected by an angle $\alpha_{22}$ away from frontal surface 312 of object. In the example shown, $\alpha_{21}$ is about 42°, and $\alpha_{22}$ is about 65°. The prism 330 is formed of two triangular portions 332 and 336, that have different slope angles $\beta$ and $\gamma$, respectively. While angle $\beta$ can be determined with Equation [2], the angle $\gamma$ of triangular portion 336 is determined with an equivalent equation, based on the propagation angle of the tertiary color $\alpha_{22}$. Patterns 352, 354, and 356 are formed on image sensor 350 for each of the primary, secondary and tertiary color PC, SC, and TC, that were emitted from the rear surfaces 337, 338 and 339 of prism 330. Middle portion 334 of prism could also be left out, so that pattern 354 of the primary color PC is directly captured from marking 315 without passing through an optical medium other than a lens or protection glass (not shown), and prism portions 332 and 336 could form two separate prism having a triangular cross-sectional shapes. Again the optical system including image sensor 350 and lens (not shown) are arranged such that its field of view is capable of capturing all three patterns 352, 354, and 356 at the same integration time of sensor 350. Patterns 352, 354, and 356 that are projected onto image sensor 350 have the respective widths $e_{21}$, e, and $e_{12}$, where width e is greater than width $e_{21}$, and width $e_{21}$ is greater than $e_{22}$, due to the geometric configuration of prism 330.

Figure 7A:
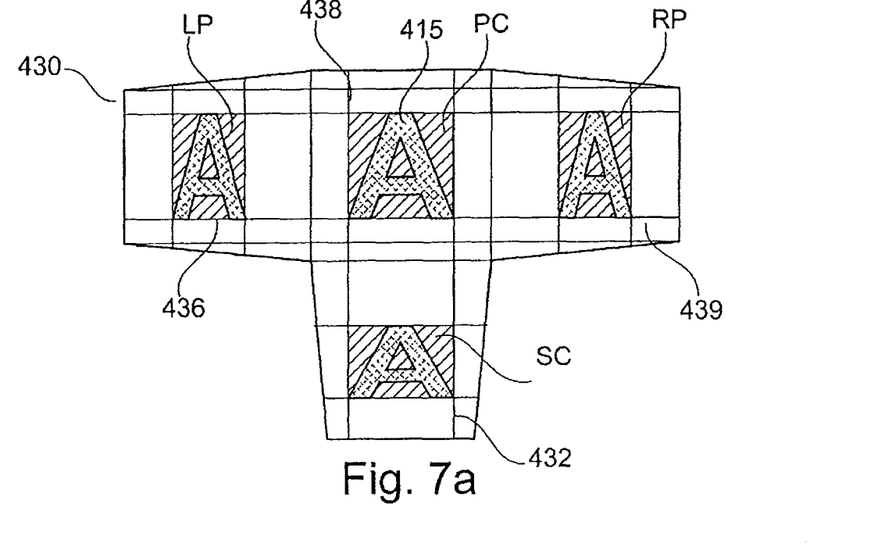
FIGS. 7A, 7B, and 7C represent schematic views of different type of prisms usable in combination with a device for measuring optical properties of optically variable markings, according to still another aspect of the present invention.
Figure 7B:
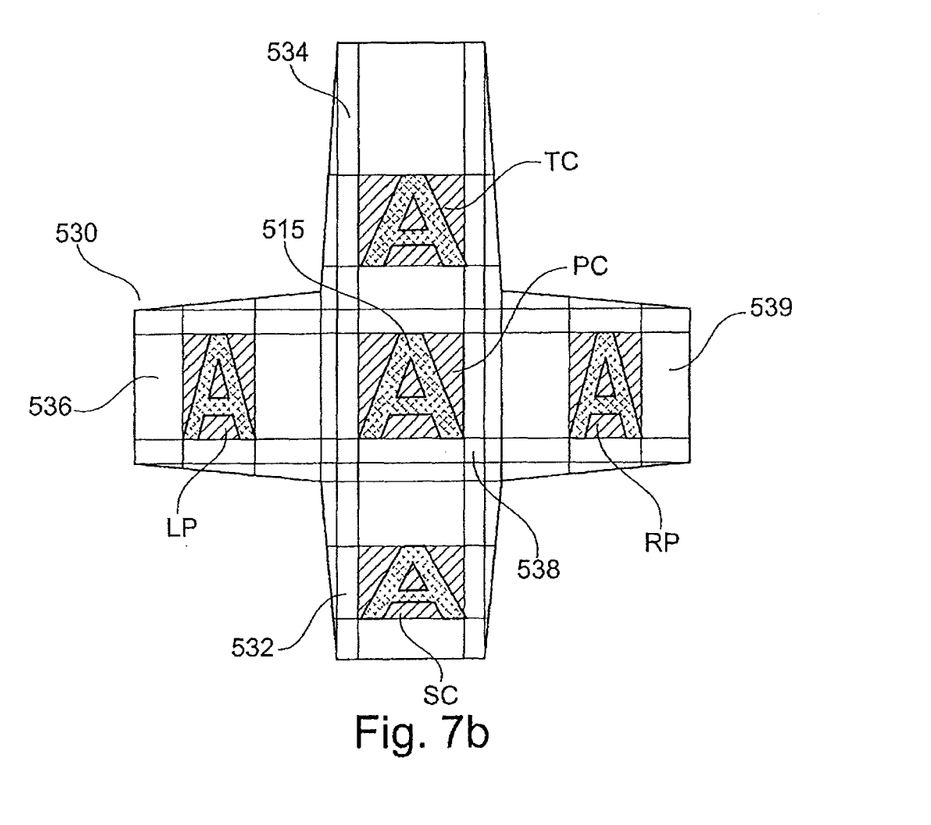
Figure 7C:
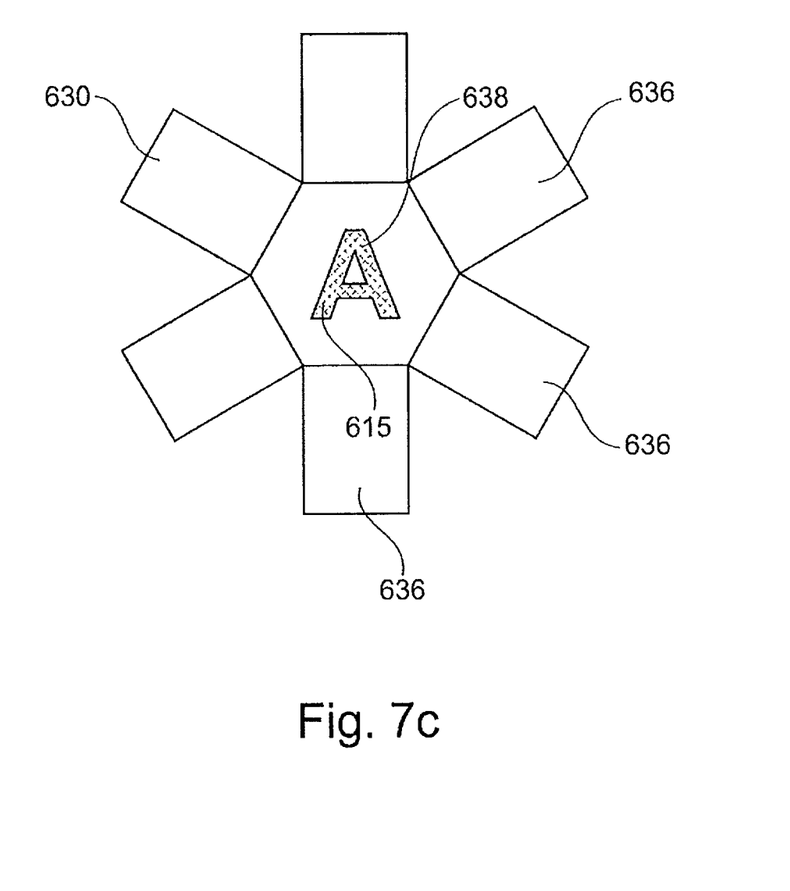

FIGS. 7A, 7B, and 7C, show various variations of a realization of a prism for a device that is configured to measure optical properties of optically variable markings with an image that has been captured by an image sensor. One goal of the use of these prisms is to redirect light that is reflected from a marking made of OVI to a single image sensor 50 of a camera, so that in one single integration time of the image sensor, various properties related to color, polarization, shape, patterns, variable transparency, etc. can be measured within a single captured image. In case the different properties of marking 415 are different colors due to color-shifting effects, another goal of the device is to bring all the different colors reflected from marking 415 to propagate towards a lens and image sensor, perpendicular to an upper surface of an image sensor. For example, FIG. 7A shows a prism 430 from a view perpendicular of a front surface of an inspected object, where left and right portions 436, 439 of prism 430 are used to refract light that has passed through a left and right polarization filter, to generate left polarized light LP and right polarized light RP. In addition, a downward portion 432 is used to refract the secondary color SC of a marking 415 of an object. Middle portion 438 is used to pass the primary color PC to the image sensor (not shown).

Another variant is shown in FIG. 7B, where left and right portions 536, 539 of prism 430 are used to refract light that has passed through a left and right polarization filters, that could be arranged as explained with respect to FIG. 5, to generate left polarized light LP and right polarized light RP. In addition, a downward portion and upward portion 532, 534 can be used to refract the secondary color SC and the tertiary color TC of marking 515 of an object, to direct the SC and TC towards an image sensor. Middle portion 538 is used to pass the primary color PC to the image sensor (not shown). In addition, FIG. 7C depicts a prism 630, where the middle portion has a hexagonal cross-sectional shape, and protruding prism portions 636 are arranged around the hexagonal shape. The protruding prism portions 636 can be configured to refract seven different patterns of different colors that are emitted from a single marking 615 by use of middle portion 638 and the six protruding portions 636, for example to project different polarizations and colors. The protruding portions can have triangular shapes with different angles, as shown in FIG. 6, to refract different colors from marking 615.

Figure 8:
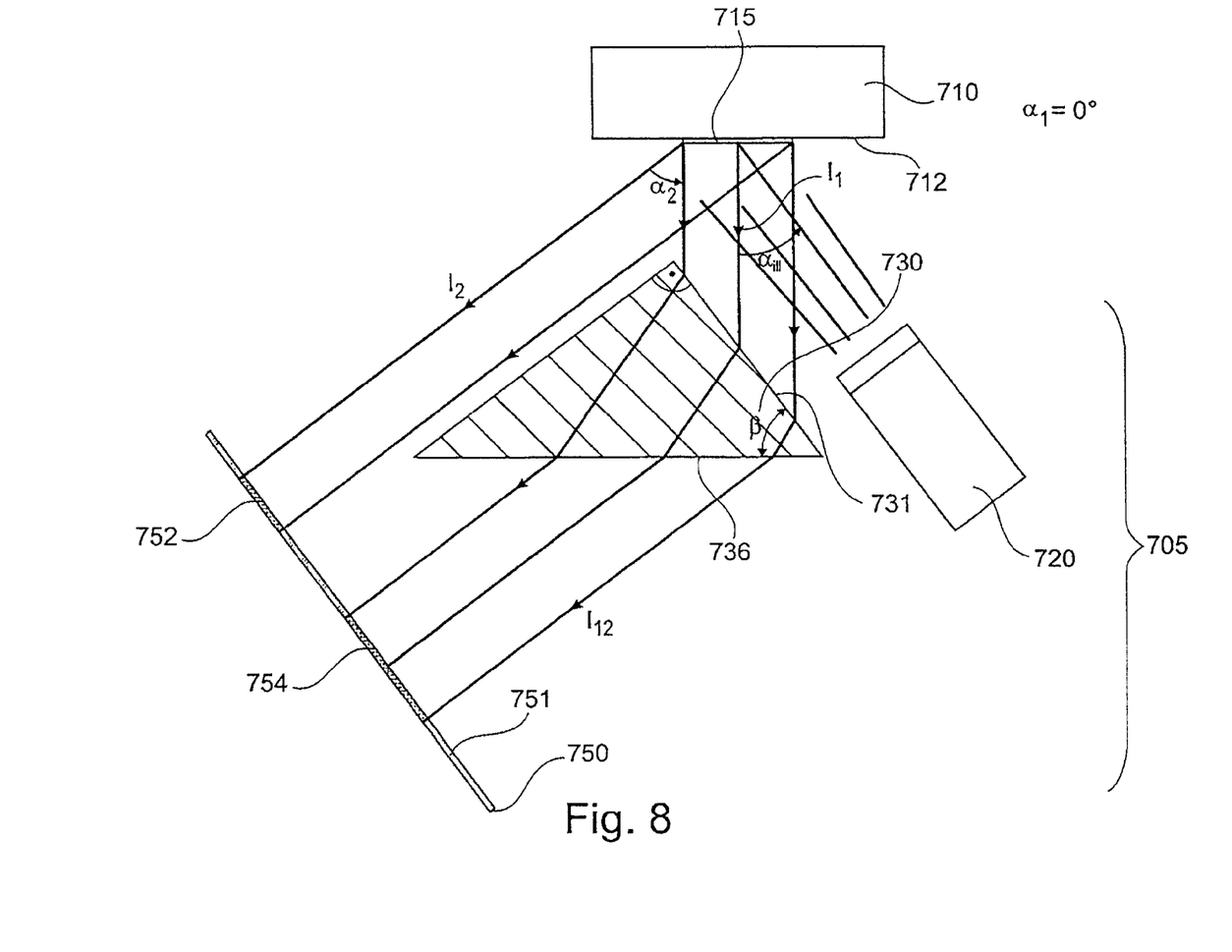
FIG. 8 shows a schematic view of the device for measuring optical properties of optically variable markings according to yet another aspect of the present invention.

FIG. 8 depicts a diagrammatic cross-sectional view of another variant of a device 705 for measuring optical properties of optically variable marking 715. In the variant shown, the upper surface 751 of image sensor 750 is not parallel to the upper surface 712 of object 710, but the image sensor 750 and lens (not shown) are arranged perpendicularly with an axis that is formed by observed light $l_2$ emitted at angle $\alpha_2$, emitting light $l_2$ with a first property. First light $l_1$ having a first property is emitted perpendicularly from surface 712 of object 710 at angle $\alpha_1=0°$ and enters a prism 730 at a front surface 731 having a triangular cross-sectional shape. Light $l_2$ then exits rear surface 736 of prism to be redirected perpendicularly towards image sensor as light $l_{21}$ having the second property. Illumination device 720 is arranged projecting wide-spectral white light at a certain illumination angle $\alpha_{ill}$, and not obstructing the reflection of lights $l_1$ and $l_2$ towards prism 730 and image sensor 750.

Figure 9:
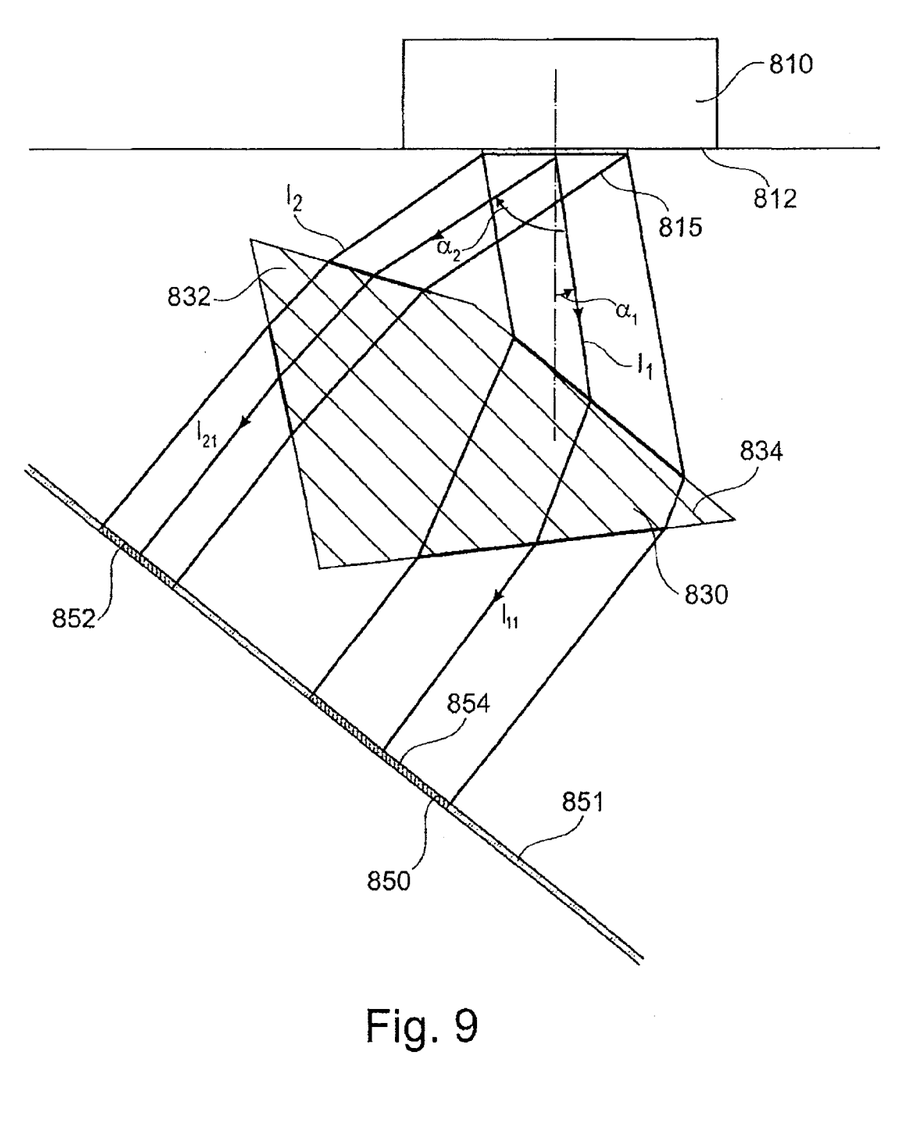
FIG. 9 shows a schematic view of the device for measuring optical properties of optically variable markings according to yet another aspect of the invention, where none of the lights propagate perpendicularly to an image sensor.

FIG. 9 depicts a diagrammatic cross-sectional view of another variant of a device 805 for measuring optical properties of optically variable marking 815, where none of the propagation angles $\alpha_1$ and $\alpha_2$ of the first and the second lights $l_1$ and $l_2$ having a first and a second property, respectively, are perpendicular to upper surface 851 of image sensor 850. In such configuration, two portion 832 and 834 of prim 830 have to be used, to refract both lights $l_1$ and $l_2$ to be directed towards the lens (not shown) and image sensor 850 as lights $l_{11}$ and $l_{21}$, and to impact on perpendicularly onto an upper surface of image sensor 850. This variant may be used to design a prism 830 having very similar propagation path lengths for lights $l_1$ and $l_2$ inside prism 830, so that patterns 852 and 854 would have similar shapes and sizes that result from prism 830.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for measuring optical properties of an optically variable marking applied on an object, said method comprising:
   illuminating said optically variable marking so as to form a first light reflected by the marking at a first view angle and a second light reflected by the marking at a second view angle, the first and second lights having different spectral compositions as a result of the optically variable marking;
   refracting said second reflected light through a optical unit so as to redirect said second reflected light toward an optical sensor;
   capturing the first light and the second refracted light with said optical sensor simultaneously; and
   determining optical properties of said optical variable marking based on said captured first and second lights.

2. The method of claim 1, further comprising:
   refracting said first reflected light through said optical unit, the first reflected light refracting through a first portion of said optical unit while the second reflected light refracting through a second portion of said optical unit, said first and second portion of said optical unit having different refracting properties from each other.

3. The method of claim 1, wherein
   said optical sensor includes a color sensor, and said step of determining further comprises:
   measuring a color property of said captured first and second lights.

4. The method of claim 3, further comprising:
   filtering at least one of the first and second lights with a polarization filter before said capturing with said optical sensor.

5. The method of claim 3, wherein said measuring comprises measuring a geometric property of said optically variable marking on the object.

6. A device configured to measure properties of an optically variable marking applied on an object, the device including:
   a light source configured to illuminate the optically variable marking so as to form a first light reflected by the marking at a first view angle and a second light reflected by the marking at a second view angle, the first and second lights having different spectral compositions as a result of the optically variable marking;
   a prism that refracts said second reflected light so as to redirect said second reflected light;
   an optical sensor that captures the first light and the second refracted light simultaneously; and
   a processing unit that determines optical properties of said optical variable marking based on said captured first light and the second refracted light.

7. The device of claim 6, wherein
   the prism refracts said first reflected light, the first reflected light refracting through a first portion of said prism while the second reflected light refracting through a second portion of said prism, said first and second portion of said prism having different refracting properties from each other.

8. The device of claim 6, further comprising:
   a polarization filter that filters at least one of the first and second reflected lights before capturing the lights with the optical sensor.

9. The device of claim 6, the prism further comprising:
   a first portion that refracts the first reflected light; and
   a second portion that refracts the second reflected light, wherein
   the first and second portion of said prism have different refracting properties from each other.

10. The device of claim 9, wherein the light source is further configured to illuminate the optically variable marking so as to form a third light reflected by the optical variable marking at a third view angle, the third view angle being different from the first and second view angles, the prism further comprising:
    a third portion that refracts the third reflected light, wherein the first, second an third portion of said prism have different refracting properties from each other.

11. A device for measuring properties of an optically variable marking applied on an object, the device including:
    a light source that illuminates the optically variable marking so as to form a first light reflected by the marking at a first view angle and a second light reflected by the marking at a second view angle, the first and second lights having different spectral compositions as a result of the optically variable marking;
    an optical refraction means for refracting the second reflected light to a direction that is different from the second view angle, to form a redirected second light;
    a optical sensing means for capturing the reflected first light and the redirected second light simultaneously; and
    a processing unit connected to the optical sensing means that determines optical properties of said optical variable marking based on information received from the optical sensing means.

12. The device of claim 11, wherein the an angular separation from the redirected second light and the first reflected light does not exceed 10°.

13. The device of claim 11, wherein an optical path of the reflected first light and an optical path of the redirected second light is such that they propagate towards the optical sensing means, to generate two separate non-overlapping projections on the optical sensing means, for the redirected second light and for the first reflected light.

* * * * *

UNITED STATES PATENT AND TRADEMARK OFFICE
CERTIFICATE OF CORRECTION

PATENT NO. : 8,467,038 B2
APPLICATION NO. : 13/172445
DATED : June 18, 2013
INVENTOR(S) : Eric Decoux et al.

It is certified that error appears in the above-identified patent and that said Letters Patent is hereby corrected as shown below:

On the title page, Item 73, the Assignee's name should read:

-- (73) Assignee: SICPA HOLDING SA, Prilly (CH) --

Signed and Sealed this
Thirteenth Day of August, 2013

Teresa Stanek Rea
*Acting Director of the United States Patent and Trademark Office*